(12) United States Patent
Schäuble et al.

(10) Patent No.: US 11,963,076 B2
(45) Date of Patent: Apr. 16, 2024

(54) FIELD DEVICE ADAPTER FOR WIRELESS DATA TRANSFER

(71) Applicant: Endress+Hauser SE+Co. KG, Maulburg (DE)

(72) Inventors: Harald Schäuble, Lörrach (DE); Tobias Paul, Schopfheim (DE); Patrick Geib, Bad Säckingen (DE); Max Jehle, Wehr (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 492 days.

(21) Appl. No.: 17/283,667

(22) PCT Filed: Sep. 5, 2019

(86) PCT No.: PCT/EP2019/073729
§ 371 (c)(1),
(2) Date: Apr. 8, 2021

(87) PCT Pub. No.: WO2020/074189
PCT Pub. Date: Apr. 16, 2020

(65) Prior Publication Data
US 2022/0014883 A1 Jan. 13, 2022

(30) Foreign Application Priority Data
Oct. 9, 2018 (DE) ...................... 10 2018 124 902.0

(51) Int. Cl.
*H04W 4/00* (2018.01)
*G05B 19/05* (2006.01)
(Continued)

(52) U.S. Cl.
CPC ............ *H04W 4/38* (2018.02); *G05B 19/054* (2013.01); *H04W 28/06* (2013.01); *H04W 84/18* (2013.01);
(Continued)

(58) Field of Classification Search
None
See application file for complete search history.

(56) References Cited

U.S. PATENT DOCUMENTS

2003/0147369 A1* 8/2003 Singh .................. H04W 12/033
370/353
2008/0280568 A1 11/2008 Kielb et al.
(Continued)

FOREIGN PATENT DOCUMENTS

CN 1501682 A 6/2004
CN 101319938 A 12/2008
(Continued)

*Primary Examiner* — Paul B Yanchus, III
(74) *Attorney, Agent, or Firm* — Mark A. Logan; Endress+Hauser (USA) Holding, Inc.

(57) ABSTRACT

Disclosed is a field device adapter for wireless data transfer for connection to a field-device-internal interface provided for a display, comprising: an interface for connection to the field-device-internal interface; a radio module configured to wirelessly transmit a data packet on a low-power wide-area network, wherein the radio module is further configured to only transmit the data packet and not to receive any data packets; adapter electronics configured to limit an energy provided via the field-device-internal interface to a predefined value and to charge a stored energy source with the limited energy. The adapter electronics are further configured to monitor a state of charge of the stored energy source and, based on the state of charge, to provide the radio module with an energy originating from the stored energy source for transmitting the data packet.

9 Claims, 1 Drawing Sheet

(51) Int. Cl.
    *H04W 4/38*     (2018.01)
    *H04W 28/06*     (2009.01)
    *H04W 84/18*     (2009.01)

(52) U.S. Cl.
    CPC ............... *G05B 2219/1176* (2013.01); *G05B 2219/15023* (2013.01); *G05B 2219/15117* (2013.01)

(56) References Cited

U.S. PATENT DOCUMENTS

| | | | |
|---|---|---|---|
| 2012/0062203 A1 | 3/2012 | Kim | |
| 2016/0104979 A1* | 4/2016 | Korn | G06F 21/602 439/620.21 |
| 2016/0124408 A1* | 5/2016 | Schauble | G05B 19/042 307/112 |

FOREIGN PATENT DOCUMENTS

| | | |
|---|---|---|
| CN | 101971558 A | 2/2011 |
| CN | 102084307 A | 6/2011 |
| CN | 102119368 A | 7/2011 |
| CN | 107707000 A | 2/2018 |
| DE | 9109176.4 U1 | 9/1991 |
| DE | 102013110673 A1 | 3/2015 |
| DE | 102015115275 A1 | 3/2017 |
| DE | 102015226734 A1 | 6/2017 |
| DE | 102016120108 A1 | 4/2018 |
| DE | 102016122714 A1 | 5/2018 |
| EP | 2527940 A2 | 11/2012 |

\* cited by examiner

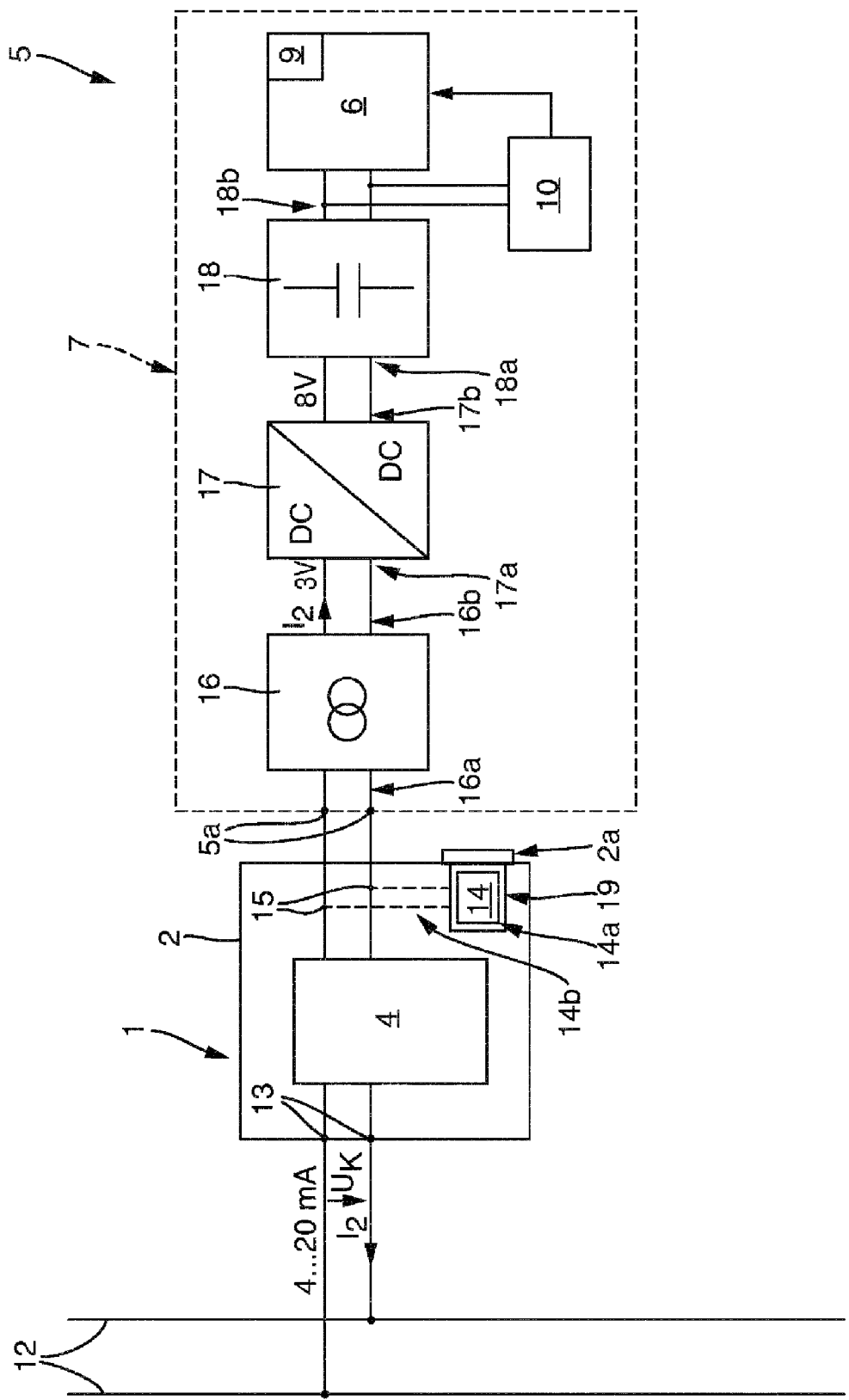

FIELD DEVICE ADAPTER FOR WIRELESS DATA TRANSFER

CROSS-REFERENCE TO RELATED APPLICATIONS

The present application is related to and claims the priority benefit of German Patent Application No. 10 2018 124 902.0, filed on Oct. 9, 2018 and International Patent Application No. PCT/EP2019/073729, filed on Sep. 5, 2019, the entire contents of which are incorporated herein by reference.

TECHNICAL FIELD

The invention relates to a field device adapter for wireless data transfer to a field-device-internal interface provided for a display of a field device, to a system for automation technology, and to a method for operating a field device adapter for wireless data transfer.

BACKGROUND

Field devices serving to capture and/or modify process variables are frequently used in process automation technology. Sensors, such as fill-level measuring devices, flow meters, pressure and temperature measuring devices, pH-redox potential meters, conductivity meters, etc., are used for recording the respective process variables, such as fill level, flow, pressure, temperature, pH level, and conductivity. Field devices, in general, refer to all devices which are process-oriented and which supply or process process-relevant information.

A variety of such field devices is manufactured and marketed by the Endress+Hauser company.

Two-wire field devices, which are connected via a two-wire line to a higher-level unit, for example a control unit PLC, are still common at the present time in a large number of existing automation systems. The two-wire field devices are designed in such a way that a supply of power takes place via the two-wire line. The two-wire field devices are designed in such a way that measurement or control values are communicated, i.e. transmitted, as a main process variable, in analog form as a 4-20 mA signal via the two-wire line or two-wire cable. In addition to their primary function, namely the generation of measured values, modern field devices have numerous further functionalities which support an efficient and reliable guidance of the process to be observed. These include, among other things, such functions as the self-monitoring of the field device, the storage of measured values, the generation of control signals for actuators, etc.

Since supply is via the two-wire line, the field devices are generally severely limited in terms of energy supply. As a result, the individual electrical components are usually matched to one another in such a way that the total energy requirement of the field device just does not exceed a maximum energy provided by the two-wire line. Due to the limited available energy, it is not readily possible to retrofit such two-conductor field devices with a field device adapter for wireless data transfer.

SUMMARY

The invention is therefore based on the object of proposing a possibility for the subsequent equipping of a field device with a field device adapter for wireless data transfer.

The object is achieved according to the present disclosure by a field device adapter for wireless data transfer, a system of automation technology, and a method.

The field device adapter according to the invention for wireless data transfer for connection to a field-device-internal interface provided for a display of a field device, comprises:
  an interface to be connected to the field-device-internal interface;
  a radio module configured to wirelessly transmit a data packet in accordance with a low-power wide-area network standard, wherein the radio module is further configured to only transmit the data packet and to receive no data packets;
  adapter electronics configured to limit an energy provided via the field-device-internal interface to a predefined value and to charge a stored energy source with the limited energy, preferably continuously, wherein the predefined value is set such that the value corresponds at most to a maximum energy requirement of the display and the adapter electronics are further configured to monitor a state of charge of the stored energy source and to provide the radio module with energy originating from the stored energy source for transmitting the data packet based on the state of charge, so that the radio module transmits the data packet.

An advantageous embodiment of the field device adapter according to the invention provides that the standard corresponds to one of the standards published in Release 13 of the 3GPP in 2016, especially an LTE Cat NB1 standard.

An advantageous development of the field device adapter according to the invention provides that the stored energy source comprises a capacitor, in particular an electrolytic capacitor, and that the adapter electronics have a boost converter which is designed to convert a voltage applied at the field-device-internal interface to a higher voltage, especially at least twice as high in relation to the applied voltage, and in addition to provide the higher voltage at the capacitor for charging. In particular, the development can provide that the radio module is configured to transmit the data packets in an active mode and to maintain a radio connection to the low-power wide-area network in a non-active mode, but to consume less energy, wherein the adapter electronics are also set up to switch the radio module from the non-active mode to the active mode when the determined state of charge of the stored energy source is reached.

A further advantageous development of the field device adapter according to the invention provides that the adapter electronics are configured to compare a currently determined state of charge with a predefined state of charge and, when the predefined state of charge is reached, to provide the radio module with energy originating from the stored energy source for transmitting the data packet, so that the radio module transmits the data packet. In particular, the development can provide that the adapter electronics are also configured in such a way that data packets of a constant size are provided, and that the size of the data packet and the predefined state of charge are matched to each other such that the energy originating from the stored energy source just suffices for transmitting a single data packet.

An alternative advantageous development of the field device adapter according to the invention provides that the adapter electronics are also configured to provide data packets of different sizes and furthermore before transmission to adapt the size of each data packet to a current state of charge of the stored energy source, so that the radio module transmits size-adapted data packets as a function of the current state of charge.

The invention further relates to a system of automation technology comprising a field device and a field device adapter for wireless data transfer according to one of the previously described developments, wherein the field device comprises field device electronics with a field-device-internal interface for a display and the field device adapter is electrically connected via the interface to the field-device-internal interface.

An advantageous development of the system according to the invention provides that the field device further has a display receptacle for the mechanical attachment of the display, and the field device adapter is positioned in the field device in such a way that the display receptacle is arranged in a housing section with a transparent housing wall, wherein the field device adapter is formed with an external contour corresponding to an external contour of the display and is inserted into the display receptacle for mechanical attachment, instead of the display, so that the field device adapter comprises the field device adapter mechanically held in the display receptacle instead of the display. The invention further relates to a method for operating a field device adapter for wireless data transfer according to one of the previously described developments on a field device, comprising the following steps:

- exposing a field-device-internal interface of the field device to which a display of the field device is electrically connectable;
- connecting the field device adapter to the field-device-internal interface, so that the field device adapter is electrically connected to the field-device-internal interface instead of the display.

BRIEF DESCRIPTION OF THE DRAWING

The invention is explained in more detail based upon the following drawing. The following is shown:

FIG. 1 shows a schematic representation of a field device in which a display provided at the factory has been retrofitted subsequently with a field device adapter designed according to the present disclosure for wireless data transfer.

DETAILED DESCRIPTION

FIG. 1 shows a two-wire field device 1 which comprises a preferably metal housing 2, in which a field-device electronics unit 4 is arranged. The field device 1 is designed in such a way as to have connection terminals 13 via which a two-wire line 12 is or can be electrically connected. Via the two-wire line 12, the field-device electronics unit 4 and thus the field device 1 are connected to a higher-level unit, not shown separately in FIG. 1, in order to communicate data wirelessly with the higher-level unit. The measured values as a main process variable are thereby communicated analogously via the two-wire line 12 in the form of a 4-20 mA current signal in that a corresponding current value of the 4-20 mA current signal is set by the field-device electronics unit. Other data, which may include, for example, parameters of the field device, are transmitted in the form of a digital two-wire signal, for example, for example in accordance with the HART standard.

Furthermore, the field-device electronics unit 4 is also supplied with energy via the two-wire line or the 4-20 mA current signal. For this purpose, operating power is made available to the field-device electronics unit as a function of a terminal voltage Uk, which is applied to the terminals, and the 4-20 mA current signal. The terminal voltage Uk usually has a minimum voltage value of approximately 10 V, so that a minimum operating power for the field-device electronics unit of Pmin=10 V*4 mA=40 mW results. In principle, however, the terminal voltage can also have a value deviating therefrom, for example a value in the range of 10-30 V, so that the minimum operating power available to the field device also changes.

In order to ensure the reliable operation of the field device 1, the field-device electronics unit 4 is designed in such a way that the field-device electronics unit can perform all functions, especially the acquisition or setting of measured values, the processing thereof and the transmission or setting of a corresponding current value of the 4-20 mA current signal by means of the minimum operating power Pmin.

Furthermore, the field-device electronics 4 are configured at the factory, i.e. by the field device manufacturer, such that a portion of the minimum operating power is permanently available for a display for displaying, for example, measurement or control values or the other data, such as parameters or configuration values of the field device, etc.

The display 14, which is formed either as part of the field device electronics or as a separate unit, is or can be connected to the field device electronics via an internal field-device interface. The field device can also comprise a display receptacle or holder for mechanically fixing the display. The display receptacle can be designed as part of the field device electronics, for example. The display receptacle can furthermore be arranged in the field device such that a display held therein is located in a housing section with a transparent housing wall, for example a housing cover. FIG. 1 also shows a field device adapter 5 according to the invention for the purpose of connecting to the internal field-device interface 15 provided for the display 14, so that the field device 1 can be retrofitted subsequently, i.e. after it has already been integrated into an automation system, for wireless data transfer. For example, the field device adapter 5 can be fitted by a service technician by mechanically removing the lid 2a of the housing 2 in order to expose the interface, releasing the connecting line 14b to the display 14 from the interface 15 and then connecting the field device adapter 5 to the interface 15.

In order to mechanically attach the field device adapter 5 in the holder 19 actually provided for the display 14, an external contour of the field device adapter 5 can correspond substantially to an external contour of the display 14a so that the holder 19 can receive the field device adapter 5.

The field device adapter 5 further comprises a current-limiting circuit 16 which is set up to limit a current I2 which is applied via the interface 15 to a predefined value, so that only a maximum operating power is provided to the field device adapter 5 via the interface. The predefined value is matched to that in the specific field device to which the adapter is to be connected. The predefined value preferably corresponds to a current value required for operating the display 14, for example a value of less than 3 mA, preferably less than 2.0 mA, particularly preferably less than 1.5 mA, and very particularly preferably the value corresponds to approximately 1 mA. Since field devices 1 usually comprise different displays 14, different field device adapters 5 can also comprise different predefined values to which the current-limiting circuit 16 limits the current flow via the internal interface 12.

The field device adapter 5 further comprises a boost converter 17 which is connected at an input 17a to an output 16b of the current-limiting circuit. The boost converter 17 is configured to convert an input voltage, which is present at its input or the output of the current-limiting circuit, to a output voltage that is higher in comparison with the input voltage. For example, the boost converter may be configured such that an input voltage is converted to an output voltage greater by a factor of 2. In the described embodiment, the boost converter 17 converts from about 3 V to about 8 V, which is provided at an output of the boost converter 17b.

A chargeable stored-energy source 18 is connected to the output 17b of the boost converter 17 with an input, so that the output voltage provided by the boost converter 17 charges the stored-energy source 18. The stored-energy source can comprise one or more capacitors, for example. In particular, electrolytic capacitors have proven preferable because of their high storage capacity in conjunction with the fact that they are relatively small in construction.

The field device adapter 5 further comprises a radio module 6 with a radio antenna 9 which is designed to transmit data packets wirelessly. In particular, the radio module 6 is configured to transmit the data packets according to the LTE Cat NB1 standard of the 3GPP Release 13 published in June 2016. Since an energy supply of the adapter electronics by the current limiting circuit must not exceed the predefined value and such a radio module 6 would require significantly more energy for receiving data packets than for their transmission, the radio module 6 is furthermore designed such that it can only transmit and not receive data packets.

In order to have sufficient energy available for transmitting a single data packet, the adapter electronics 10, 16, 17, 18 are configured to monitor a state of charge or charge level of the stored energy source 18 and to provide the radio module 6 with energy necessary for transmitting the data packet as a function of the state of charge. For this purpose, the adapter electronics can provide a logic unit 10, for example comprise a microprocessor and/or a Schmitt trigger circuit.

In addition, the adapter electronics 10, 16, 17, 18 can be configured to convert the data originating from the field device 1 via the field-device-internal interface 15 into data packets of a constant size. This means that all data packets transmitted one after the other by the radio module will have the same size. Due to the constant size of the data packets, the adapter electronics 10, 16, 17, 18 can also be configured to compare a current state of charge of the stored energy source 18 with a constant predefined state of charge and to provide the energy stored in the stored energy source 16 to the radio module 6 for transmitting a data packet when the predefined state of charge is reached. The predefined state of charge is in this case dimensioned such that the energy stored in the stored energy source 16 is just sufficient for transmitting a single data packet by the radio module 6. In this way, data packets can be transmitted by the adapter at a constant time interval, for example every hour, every day, etc.

Alternatively, the adapter electronics 10, 16, 17, 18 can be configured to convert the data originating from the field device 1 via the field-device-internal interface 15 into data packets of different sizes. Due to the different sizes of the data packets, the adapter electronics 10, 16, 17, 18 can also be configured to adapt the size to a currently determined state of charge of the stored energy source 18, so that the radio module 6 transmits data packets of different sizes. This means that the radio module 6 will transmit the data packets as soon as the energy stored in the stored energy source 18 is sufficient for this purpose. A time interval between the data packets transmitted one after the other is thus not absolutely constant.

The invention claimed is:

1. A field device adapter for wireless data transfer for connection to a field-device-internal interface provided for a display of a field device, the field device adapter comprising:
    an interface for connection to the field-device-internal interface provided for the display of the field device;
    a radio module configured to wirelessly transmit a data packet in accordance with a standard of a low-power wide-area network, wherein the radio module is further configured only to transmit the data packet and not to receive any data packets; and
    an adapter electronics, including:
        a current-limiting circuit configured to limit an energy drawn via the field-device-internal interface to a predefined value corresponding to a maximum energy requirement of the display; and
        a stored energy source,
        wherein the adapter electronics are configured to charge the stored energy source with the limited energy, to monitor a state of charge of the stored energy source, and to compare a currently determined state of charge with a predetermined state of charge, and
        wherein the adapter electronics are further configured to provide the radio module with energy originating from the stored energy source when the predetermined state of charge is reached,
    wherein the radio module is further configured to transmit the data packet based on the provided energy.

2. The field device adapter according to claim 1, wherein the standard corresponds to one of the standards published in Release 13 of the 3GPP in 2016, including an LTE Cat NB1 standard.

3. The field device adapter according to claim 1, wherein the stored energy source includes a capacitor and the adapter electronics include a boost converter designed to convert a voltage applied at the field-device-internal interface to a higher voltage and to provide the higher voltage at the capacitor for charging.

4. The field device adapter according to claim 3, wherein the radio module is configured to transmit the data packets in an active mode and to maintain a radio connection to the low-power wide-area network in a non-active mode, but to consume less energy, wherein the adapter electronics are also configured to switch the radio module from the non-active to the active mode when the determined state of charge of the stored energy source is reached.

5. The field device adapter according to claim 4, wherein the adapter electronics are further configured to provide data packets of a constant size and the size of the data packet and the predefined state of charge are matched to one another such that the energy originating from the stored energy source is just sufficient for transmitting a single data packet.

6. The field device adapter according to claim 4, wherein the adapter electronics are further configured to provide data packets of different sizes and also to adapt the size of each data packet before transmission to the determined state of charge of the stored energy source, so that the radio module transmits size-adapted data packets as a function of the determined state of charge.

7. An automation technology system, comprising:
    a field device having an interface for a display internal to the field device; and a field device adapter for wireless data transfer, including:
   an interface for connection to the field-device-internal interface provided for the display of the field device;
   a radio module configured to wirelessly transmit a data packet in accordance with a standard of a low-power wide-area network, wherein the radio module is further configured only to transmit the data packet and not to receive any data packets; and
   an adapter electronics, including:
      a current-limiting circuit configured to limit an energy drawn via the field-device-internal interface to a predefined value corresponding to a maximum energy requirement of the display; and
      a stored energy source,
      wherein the adapter electronics are configured to charge the stored energy source with the limited energy, to monitor a state of charge of the stored energy source, and to compare a currently determined state of charge with a predetermined state of charge, and
      wherein the adapter electronics are further configured to provide the radio module with energy originating from the stored energy source when the predetermined state of charge is reached,
   wherein the radio module is further configured to transmit the data packet based on the provided energy,
wherein the field device adapter is electrically connected to the field-device-internal interface via the interface of the field device adapter.

8. The automation technology system according to claim 7, wherein the field device further includes a display receptacle for mechanically attaching the display and the field device electronics are positioned in the field device such that the display receptacle is arranged in a body portion having a transparent housing wall, wherein the field device adapter is formed with an external contour corresponding to an external contour of the display and the field device adapter is inserted into the display receptacle for mechanical attachment, instead of the display, so that the field device comprises the field device adapter held in the display receptacle instead of the display.

9. A method for operating a field device adapter for wireless data transfer on a field device, the method comprising:
   providing the field device adapter, including:
      an interface for connection to a field-device-internal interface provided for a display of the field device;
      a radio module configured to wirelessly transmit a data packet in accordance with a standard of a low-power wide-area network, wherein the radio module is further configured only to transmit the data packet and not to receive any data packets; and
      an adapter electronics, including:
         a current-limiting circuit configured to limit an energy drawn via the field-device-internal interface to a predefined value corresponding to a maximum energy requirement of the display; and
         a stored energy source,
         wherein the adapter electronics are configured to charge the stored energy source with the limited energy, to monitor a state of charge of the stored energy source, and to compare a currently determined state of charge with a predetermined state of charge, and
         wherein the adapter electronics are further configured to provide the radio module with energy originating from the stored energy source when the predetermined state of charge is reached,
      wherein the radio module is further configured to transmit the data packet based on the provided energy;
   exposing the field-device-internal interface of the field device to which a display of the field device is electrically connectable; and
   connecting the field device adapter to the field-device-internal interface so that the field device adapter is electrically connected to the field-device-internal interface instead of the display.

* * * * *